US 6,529,989 B1

(12) United States Patent
Bashford et al.

(10) Patent No.: US 6,529,989 B1
(45) Date of Patent: Mar. 4, 2003

(54) INTELLIGENT EXPANSION ROM SHARING BUS SUBSYSTEM

(75) Inventors: Patrick R. Bashford, Fort Collins, CO (US); Paul S. Grist, Merrimack, NH (US); Donald N. Allingham, Fort Collins, CO (US); Ralph F. Ware, Jr., Salem, MA (US); Eric S. Noya, Groton, MA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/564,105

(22) Filed: May 3, 2000

(51) Int. Cl.[7] .................... G06F 13/00; G06F 3/00; G06F 9/445
(52) U.S. Cl. .................... 710/306; 710/10; 710/104; 713/2
(58) Field of Search ................... 710/100–104, 710/8–19, 305–315; 713/1, 2, 100

(56) References Cited

U.S. PATENT DOCUMENTS

| | | | | | |
|---|---|---|---|---|---|
| 5,608,876 | A | * | 3/1997 | Cohen et al. | 710/300 |
| 5,835,760 | A | * | 11/1998 | Harmer | 713/2 |
| 5,854,905 | A | * | 12/1998 | Garney | 710/104 |
| 5,999,476 | A | * | 12/1999 | Dutton et al. | 565/230.1 |
| 6,154,838 | A | * | 11/2000 | Le et al. | 713/2 |
| 6,272,584 | B1 | * | 8/2001 | Stancil | 710/241 |
| 6,282,647 | B1 | * | 8/2001 | Leung et al. | 713/710 |
| 6,401,140 | B1 | * | 6/2002 | Wu | 710/10 |
| 6,401,198 | B1 | * | 6/2002 | Harmer et al | 713/1 |

\* cited by examiner

*Primary Examiner*—Sumati Lefkowitz
(74) *Attorney, Agent, or Firm*—Martine & Penilla, LLP

(57) ABSTRACT

The present invention provides a RAID controller coupled to a host computer system through a primary PCI bus. The RAID controller includes a PCI application bridge, a RAID processor and chipset, and an expansion ROM. The PCI application bridge is coupled to interface data and command transfers between the primary PCI bus and a secondary PCI bus. The RAID processor and chipset is coupled to said secondary PCI bus for controlling access to said one or more RAID arrays. The expansion ROM is configured to store device specific codes and BIOS codes for initializing said RAID controller and said host computer system for boot-up. For initializing said RAID controller, the said RAID processor and chipset accesses said device specific codes in said expansion ROM. The RAID processor and chipset provides a first address corresponding to said BIOS codes in said expansion ROM to said PCI bus application bridge. The PCI application bridge translates a host address from said host computer system using said first address to access said BIOS codes for initializing said host computer system.

25 Claims, 5 Drawing Sheets

INTELLIGENT EXPANSION ROM SHARING BUS SUBSYSTEM

BACKGROUND OF THE INVENTION

1. Field of the Invention

This invention relates generally to intelligent bus subsystems, and more particularly to intelligent PCI bus subsystems that use expansion ROMs for boot-up and initialization.

2. Description of the Related Art

Modern computer systems typically employ buses to convey information between various parts in the computer systems. For example, computer systems generally include one or more buses to connect a central processing unit (CPU) to a main memory and input/output (I/O) devices for transferring data and control signals. Today, one of the most widely used buses is peripheral component interface (PCI) bus.

With the proliferation of I/O devices such as disk drives, tape drives, printers, scanners, and audio/video devices, the PCI bus is used to connect an increasing number of I/O devices. To accommodate the addition of more I/O devices, conventional computer systems typically provide one or more secondary PCI buses in addition to a primary PCI bus. An intelligent PCI subsystem provides a secondary PCI bus for this purpose. The I/O devices coupled to a secondary PCI on an intelligent PCI subsystem are typically not "visible" from the primary PCI bus. For communicating with devices on the primary PCI bus, each secondary PCI bus typically is coupled to the primary PCI bus through a PCI application bridge, which is often referred to as a non-transparent or opaque PCI bridge. A PCI application bridge and devices attached to the PCI bridge form a PCI subsystem.

Conventional PCI subsystems often require device specific software codes to be stored in an expansion ROM for use by a host processor from the primary PCI bus. In addition, local processors in intelligent PCI subsystems typically store device specific software codes in a separate expansion ROM connected to the associated local core logic chipsets for use by the local processors. Some examples of device specific codes are power-on self-test code, initialization code, interrupt service routine, BIOS routine, boot code, etc.

FIG. 1 illustrates a schematic block diagram of a conventional computer system 100 that uses a pair of expansion ROMs 132 and 134 for storing device specific software codes. In the computer system 100, a primary PCI bus 104 is coupled to a host bus bridge 108 on the host side and to a PCI-to-PCI bridge 106 on the other. A host CPU 102 and a main memory 110 are coupled to the host bus bridge 108. The host bus bridge 108 provides host chipset and functions as a memory controller in accessing the main memory 110. In this configuration, the CPU 102 accesses the main memory 110 through the host bus bridge 108 to read or store information. The primary PCI bus 104 may also be coupled to other devices such as hard disk drives, audio/video devices, etc.

A secondary PCI bus 112 is coupled to the PCI-to-PCI bridge 106, a SCSI adapter 114, and a local CPU and chipset 116. The SCSI adapter 114 is connected to a SCSI device 118 (e.g., SCSI drive, tape drive, CD drive, etc.) to provide additional functionality to the computer system 100. The local CPU 116 provides additional processing capabilities and may be used, for example, as an I/O controller, audio/video processor, etc. In addition, other peripheral SCSI devices may also be attached to the secondary PCI bus 112 via SCSI adapter 114 or other SCSI adapters for providing additional functions.

The PCI-to-PCI bridge 106 is coupled between the primary PCI bus 104 and a secondary PCI bus 112 and functions to facilitate communication between the PCI devices coupled to the primary PCI bus 104 and the secondary PCI bus 112. Specifically, the PCI-to-PCI bridge 106 includes a primary PCI interface 120, a secondary PCI interface 122, a bridge FIFO and controller 124, an expansion ROM base address register 128, and an expansion ROM interface logic and device pins 130. The primary and secondary PCI interfaces 120 and 122 provide interface functions between the primary and secondary PCI buses 104 and 112 for communicating data and control signals. In particular, the primary PCI interface 120 interfaces with the primary PCI bus 104 on the host side while the secondary PCI interface 122 interface with the secondary PCI bus 112.

Provided between the primary and secondary PCI buses 120 and 122, the bridge and FIFO controller 124 receives transactions (e.g., requests or commands) on one bus as a slave and determines whether to pass the transaction to the other bus. When it determines that the transaction is to be passed on to the other bus, the bridge and FIFO controller 124 transmits the transaction onto the other bus as a master. For example, the bridge and FIFO controller 124 may receive and transmit a request between the PCI buses 104 and 112 via PCI interfaces 120 and 122.

The PCI-to-PCI bridge 106 allows mapping of address space of one bus into the address space of the other bus through the use of internal configuration registers. Conventional PCI bridges are well known and is described, for example, in U.S. Pat. No. 5,918,026, entitled "PCI to PCI Bridge for Transparently Completing Transactions between Agents on Opposite Sides of the Bridge," and in U.S. Pat. No. 5,905,877 entitled "PCI Host Bridge Multi-Priority Fairness Arbiter." In addition, details of PCI specification and bus systems are described by Tom Shanley et al. in PCI System Architecture ($3^{rd}$ ed. 1995). The disclosures of these references are incorporated herein by reference.

One of the internal registers provided in the PCI-to-PCI bridge is the expansion ROM base address register 128, which is coupled between the primary PCI interface 120 and an expansion ROM interface logic and device pins 130. The expansion ROM base address register 128 typically stores the start memory address and size of the expansion ROM 132. The expansion ROM interface logic and device pins provide interface to the expansion ROM 132 for accessing the stored device specific software. Additionally, the local CPU and chipset 116 also provided with the expansion ROM 134, which stores device specific codes for the local CPU and chipset 116. For example, device specific codes such as boot code, initialization code, BIOS, etc. may be stored in the expansion ROM 134.

When the computer system 100 is powered on, the host CPU 102 copies the device specific code such as BIOS codes from the expansion ROM 132. Concurrently, the local CPU and chipset 116 copies the device specific code from its expansion ROM 134 into its internal memory. The accessed device specific codes are then used to initialize the host computer and local CPU and chipset 116.

However, one of the drawbacks of such computer system is cost. In particular, using separate expansion ROMs for the bridge 106 and local CPU and chipset 116 entails substantial cost. Additionally, the expansion ROMs 132 and 134 requires a dedicated interface circuits and logic to communicate with the bridge and local CPU and chipset 116, respectively. Furthermore, manufacturers are increasingly phasing out small expansion ROMs as they move to larger expansion ROMs. Since the expansion ROMs, particularly for expansion ROM 132 for the PCI bridge, tends to be small in size, using a large dedicated expansion ROM for the PCI bridge results not only in higher cost but also leads to a waste of ROM space.

Thus, what is needed is a PCI subsystem that allows the host computer and the local CPU and chipset to initialize efficiently at boot-up without the cost associated with using multiple expansion ROMS.

SUMMARY OF THE INVENTION

The present invention fills these needs by providing an intelligent expansion ROM sharing bus subsystem. It should be appreciated that the present invention can be implemented in numerous ways, including as a process, an apparatus, a system, a device, a method, or a computer readable medium. Several inventive embodiments of the present invention are described below.

In one aspect of the invention, the present invention provides a RAID controller coupled to a host computer system through a primary PCI bus. The RAID controller includes a PCI application bridge, a RAID processor and chipset, and an expansion ROM. The PCI application bridge is coupled to interface data and command transfers between the primary PCI bus and a secondary PCI bus. The RAID processor and chipset is coupled to the secondary PCI bus for controlling access to one or more RAID arrays. The expansion ROM is configured to store device specific codes and BIOS codes for initializing the RAID controller and the host computer system for boot-up. For initializing the RAID controller, the RAID processor and chipset accesses the device specific codes in the expansion ROM. The RAID processor and chipset provides a first address corresponding to the BIOS codes in the expansion ROM to the PCI bus application bridge. The PCI application bridge translates a host address from the host computer system using the first address to access the BIOS codes for initializing the host computer system.

In another aspect of the invention, the present invention provides an intelligent bus subsystem for use with a host computer. The bus system is coupled to the host computer through a primary bus. The intelligent bus subsystem includes an application bridge, a local processor and chipset, and an expansion ROM. The application bridge is coupled to interface data and command transfers between the primary bus and a secondary bus. The local processor and chipset is coupled to the secondary bus for processing data. The expansion ROM is coupled to the local processor and chipset for storing device specific codes and BIOS code for initializing the local processor and chipset and the host computer system for boot-up. The local processor and chipset accesses the device specific codes in the expansion ROM to initialize the local processor and chipset. The local processor and chipset provides a starting base address to the BIOS code in the expansion ROM to the bus application bridge. The application bridge translates a host address from the host computer system using the starting base address to access the BIOS code for initializing the host computer system.

Preferably, the primary and secondary buses are PCI buses. The expansion ROM stores both the boot code for the local processor and chipset and BIOS code for host computer. In one embodiment, the application bridge includes an address translation and forwarding logic for translating the host address into the address corresponding to the starting address of the BIOS code in the expansion ROM.

The present invention thus provides a low-cost intelligent bus subsystem for booting up both the host computer and the bus subsystem. In particular, by storing a relatively small BIOS code in a single expansion ROM 220 for the RAID processor and chipset 218, the present invention effectively leverages cost and complexity of the bus subsystem 204 in storing the necessary codes for booting up and initializing the computer system 200. Further, the use of a single ROM to support both the host computer and bus subsystem effectively eliminates duplicate logic circuits for accessing multiple expansion ROM typically required in conventional systems. Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

The present invention, intelligent expansion ROM sharing bus subsystem, is described. It will be obvious, however, to one skilled in the art, that the present invention may be practiced without some or all of these specific details. In other instances, well known process operations have not been described in detail in order not to unnecessarily obscure the present invention.

The present invention provides an intelligent bus subsystem having a single expansion ROM for initializing both a host computer and the bus subsystem. The bus subsystem includes a bridge device and a local processor and chipset. Within the bus subsystem, the expansion ROM is configured to store device specific software codes for both the host computer and the local processor and chipset in different regions in the expansion ROM. At boot-up, the local processor and chipset accesses associated device specific software codes for initializing the bus subsystem. An application bridge in the bus subsystem then allows the host computer to access the device specific software codes for initialization by translating addresses from the host computer to the associated address in the expansion ROM.

Figure 1:
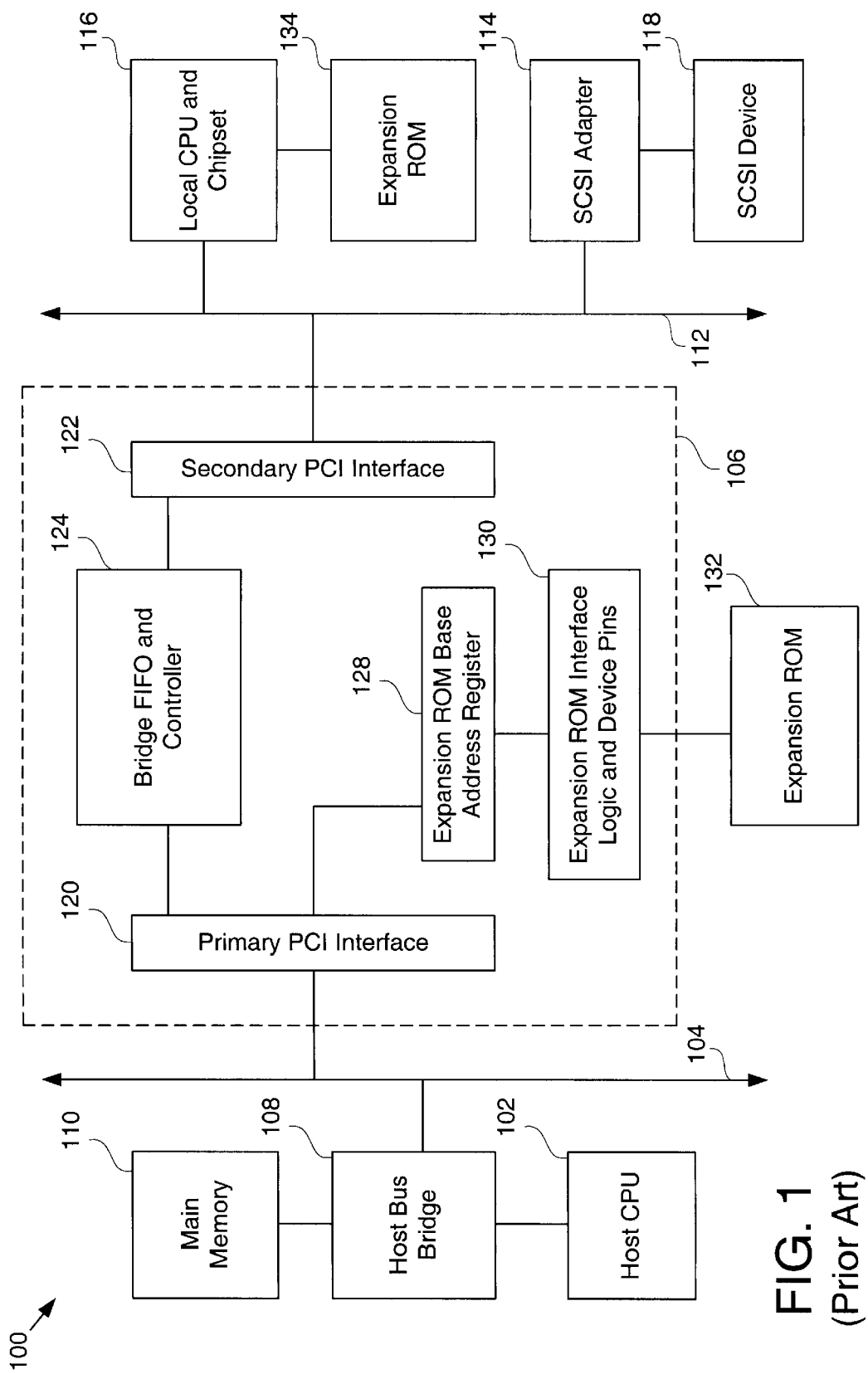
FIG. 1 illustrates a schematic block diagram of a conventional computer system that uses a pair of expansion ROMs for storing device specific software codes.
Figure 2:
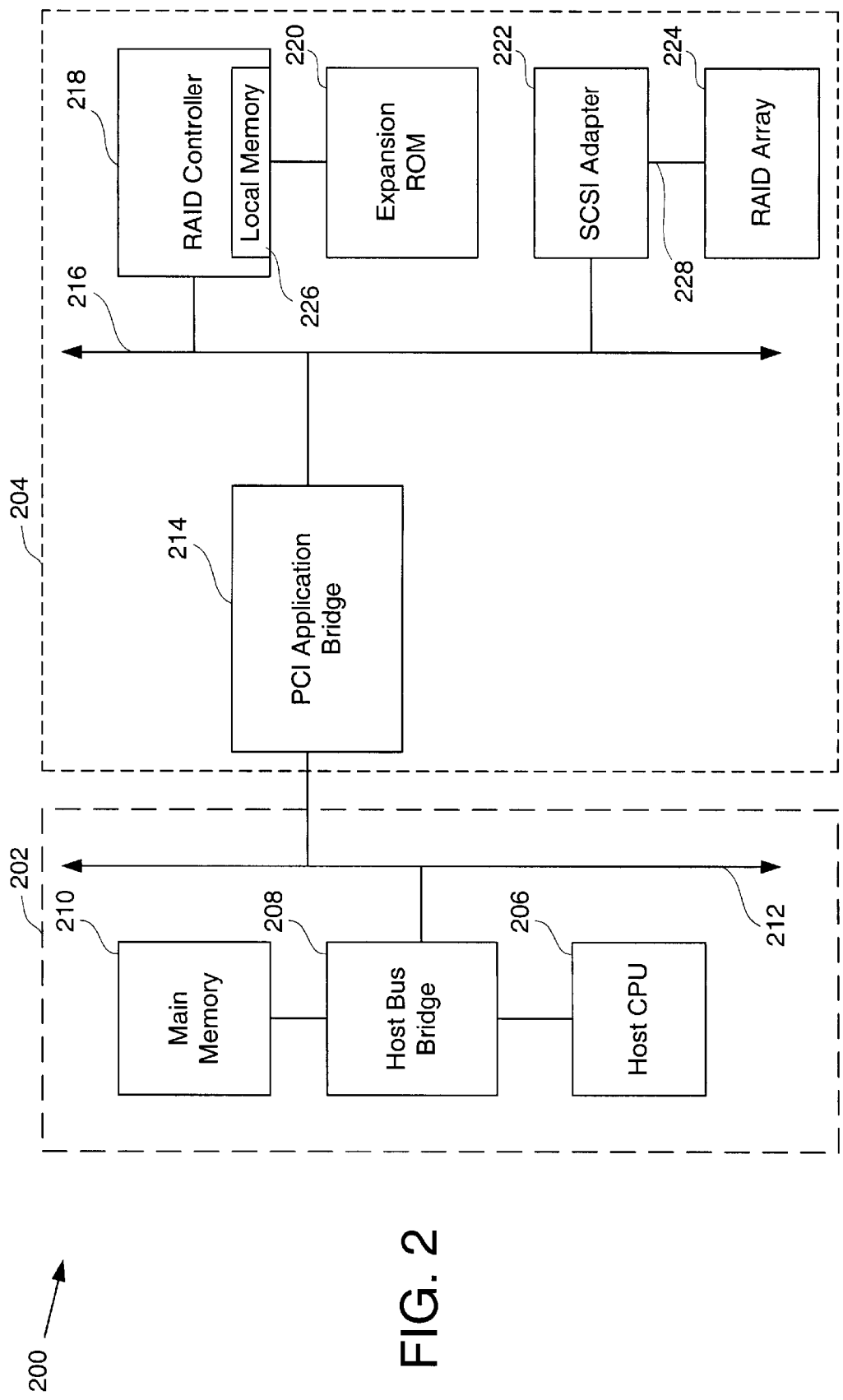
FIG. 2 illustrates a schematic block diagram of an exemplary computer system having a host computer and a PCI bus subsystem in accordance with one embodiment of the present invention.

FIG. 2 illustrates a schematic block diagram of an exemplary computer system 200 having a host computer 202 and a PCI bus subsystem 204 in accordance with one embodiment of the present invention. The host computer 202 includes a host CPU 206, a host bus bridge 208, a main memory 210 (e.g., DRAM, SDRAM, RDRAM, SRAM, etc.), and a primary PCI bus 212. The main memory 210 is coupled to host bus bridge 208 for storing and providing information. The host CPU 206 is also coupled to the host bus bridge 208 and processes information such as data and instructions received from the memory 210. The host bus bridge 208 is coupled to the primary PCI bus 212 and provides functions of conventional host chipset circuitry and memory controller for controlling access to the main memory 210. Other devices may be coupled to the primary PCI bus 212 such as a hard drive, sound card, graphics controller card, etc. The primary PCI bus 212 serves as a host bus, to which additional peripheral devices can be connected via one or more host adapters. Although the present invention is illustrated using PCI bus and bus subsystem, it may employ any suitable buses such as ISA, VESA, AGP, or the like and corresponding bus subsystems.

The PCI bus subsystem 204 includes a PCI application bridge 214, a secondary PCI bus 216, a redundant array of independent disks (RAID) processor and chipset 218, an expansion ROM 220, a SCSI adapter 222, and a RAID array 224. The PCI application bridge 214 is coupled to coordinate data command transfers between the primary and secondary PCI buses 212 and 216. The RAID processor and chipset 218 and the SCSI adapter 222 (e.g., PCI-to-SCSI adapter) are coupled to the secondary PCI bus 216 to provide RAID functions to the host computer 202. For example, the RAID array 224 may be coupled to the SCSI adapter 222 to provide additional storage capacity with redundancy to the computer system 200.

Except for the RAID array 224, the entire PCI bus subsystem 204 forms a RAID controller and is preferably provided on an expansion card or board that can be plugged into a PCI bus slot provided in a mother board of the computer system 200. It should be appreciated that, although such PCI devices are illustrated herein, the present invention may also include any suitable PCI devices such as tape drives, optical drives, magnetic drives, scanners, printers, and other I/O devices and controllers. In addition, the present invention is also applicable to any intelligent PCI bus subsystem that includes a local processor with chipset that requires an expansion ROM for initialization.

The RAID array 224 provides a high performance fault-tolerant means of storing a large amount of data. RAID arrays are well known and are described, for example, by Paul Massiglia in *The RAID Book, A Storage System Technology Handbook* ($6^{th}$ Ed. 1997), which is incorporated herein by reference. To implement RAID features, the RAID processor and chipset 218 controls RAID data processing by coordinating communication of data between the SCSI adapter 222 and the PCI application bridge 214. In this case, the RAID processor and chipset 218 operates to process data to be stored in or retrieved from the RAID array 224 through the SCSI adapter 222. Preferably, the RAID processor and chipset 218 is implemented by using a local CPU and chipset and a local memory 226. However, the present invention is equally applicable to any intelligent bus subsystems that include a local CPU and chipset using an expansion ROM. The RAID array 224 may be implemented, for example, by using a set of SCSI hard drives that are coupled to the SCSI bus cable 228.

In one embodiment, the PCI bus subsystem 204, with the exception of the RAID array 224, is implemented on an adapter card that can be plugged into the computer system 200 for communication with the host computer 202. For example, the PCI bus subsystem 204 may be mounted on a card that is configured to be plugged into a PCI bus slot provided in the motherboard of the computer system 200. The RAID array 224 is then coupled to the SCSI adapter 222 in the adapter card through the use of the SCSI cable 228.

The PCI application bridge 214, RAID processor and chipset 218, and SCSI adapter 222 are commonly known as PCI devices and may function as either a master or a slave device. A master device is one that can arbitrate for access to a bus to communicate with a slave (i.e., target) device. A master that has won arbitration and has been granted access to the bus is called an initiator. The initiator typically starts a transaction by asserting FRAME# and driving the address and command (e.g., request) signals onto the bus. For example, the SCSI adapter 222, as an initiator, may issue a read command to read data from the main memory 210. The PCI application bridge 214 receives the request as a slave on the secondary bus side and issues a proxy request as a master to the host bus bridge 208, which fetches the requested data from the memory 210 for transmission to the SCSI adapter 222 to be stored in the RAID array 224.

Figure 3:
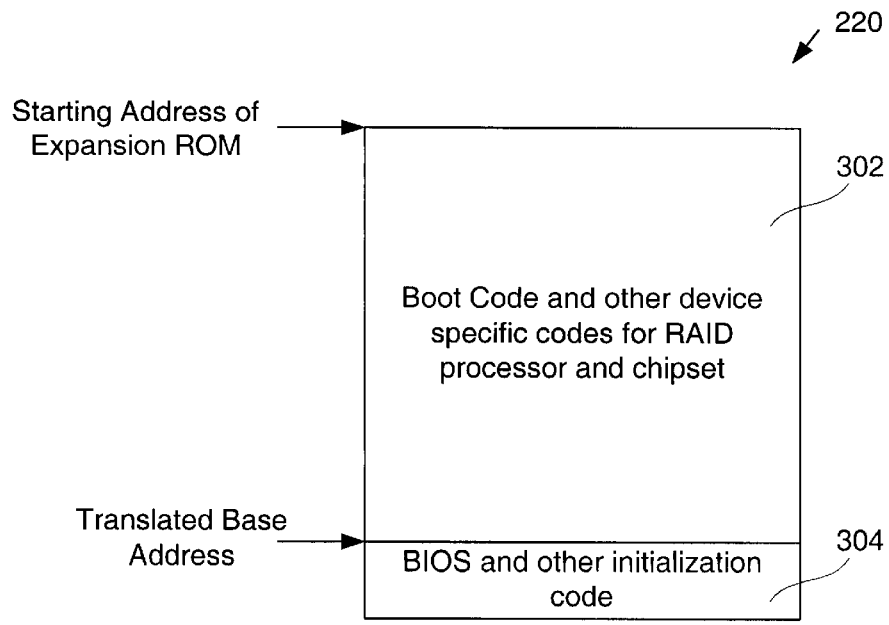
FIG. 3 illustrates a more detailed block diagram of an exemplary expansion ROM in accordance with one embodiment of the present invention.

To initialize the computer system 200 at boot-up, the expansion ROM 220 is configured to store boot codes for the RAID processor and chipset 218 and BIOS code for the host computer 202. FIG. 3 illustrates a more detailed block diagram of the expansion ROM 220 in accordance with one embodiment of the present invention. The expansion ROM 220 is partitioned into two regions 302 and 304. The region 302 stores boot code for the RAID processor and chipset 218 starting at the starting address of the expansion ROM 220. In region 304, BIOS is stored starting at a translated base address location in the expansion ROM 220. It should be noted, however, that each region 302 and 304 may be located in any contiguous areas in the expansion ROM 220. In addition to these codes, both regions 302 and 304 may also store other device specific software codes to facilitate boot-up and initialization process.

The expansion ROM 220 may be any suitable size to accommodate the codes to be stored. Preferably, the region 302 allocated for the boot code of the RAID processor and chipset 218 is significantly larger in size than the region 304 storing the BIOS code. For example, the entire expansion ROM 220 may be 2 Megabytes in size with the region 304 occupying 64 Kilobytes of the memory area. The rest of the expansion ROM 220 is allocated to the region 302. By thus storing a relatively small BIOS code in a single expansion ROM 220 for the RAID processor and chipset 218, the present invention effectively leverages cost and complexity of the bus subsystem 204 in storing the necessary codes for booting up and initializing the computer system 200.

Figure 4:
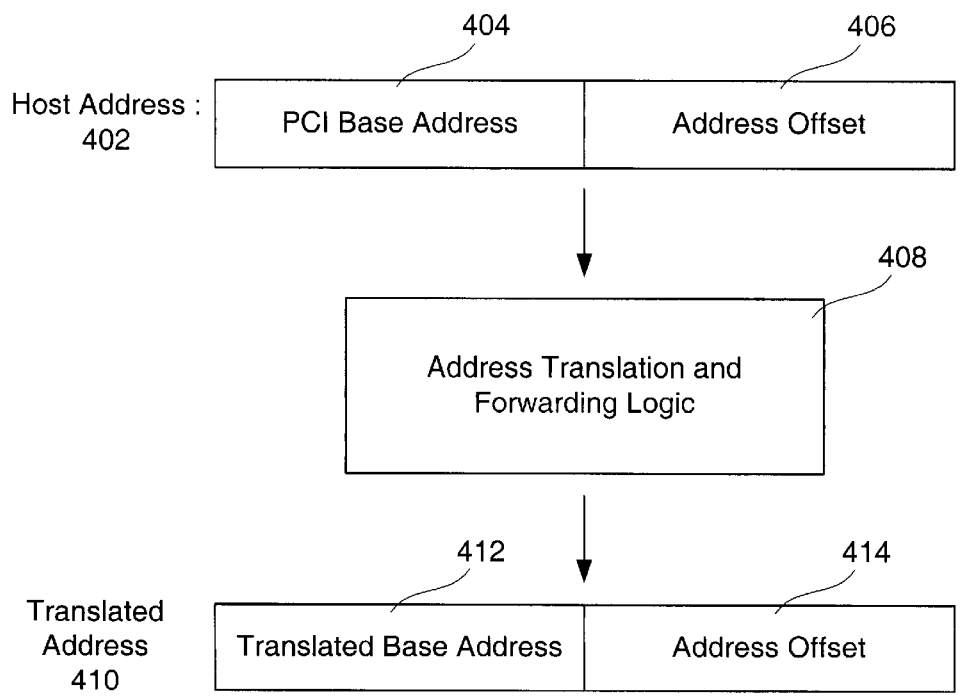
FIG. 4 is a schematic diagram of an exemplary translation process performed by an exemplary PCI application bridge in accordance with one embodiment of the present invention.

When the computer system 200 is powered on, the RAID processor and chipset 218 boots up by accessing the boot code stored in the expansion ROM 220. The RAID processor and chipset 218 then provides the translated base address of the BIOS code in region 304 to the PCI application bridge 214 for translating addresses from the host computer 202. FIG. 4 is a schematic diagram of an exemplary translation process performed by the PCI application bridge 214 in accordance with one embodiment of the present invention. The PCI application bridge 214 receives a host address 402 in PCI address space from the host computer 202. The host address 402 includes a PCI base address 404 and an address offset 406. An address translation and forwarding logic 408 in the PCI application bridge 214 then translates the host address 402 into translated address 410 by replacing the PCI base address 404 with the translated base address 412. The address offset 406 remains unchanged and is output as address offset 414 in the translated address. The PCI application bridge 214 then uses the translated address 410 to access the BIOS stored in the region 304 of the expansion ROM 220 attached to the RAID processor and chipset.

Figure 5:
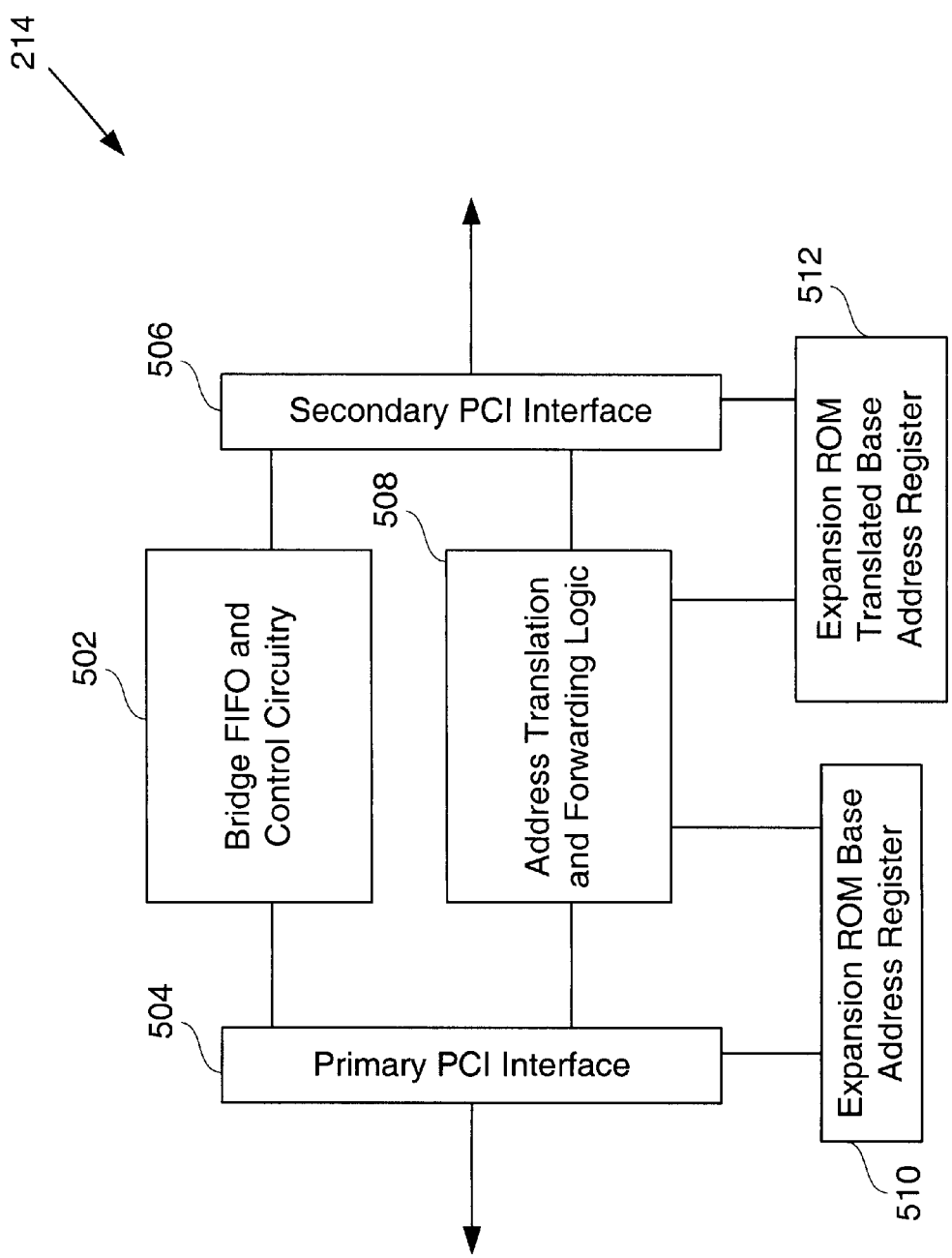
FIG. 5 shows a more detailed block diagram of the PCI application bridge in accordance with one embodiment of the present invention.

To allow the host computer 202 to access the BIOS stored in region 304 of the expansion ROM 220, the PCI application bridge implements a translation logic to redirect a PCI address to an associated address using the translated base address. FIG. 5 shows a more detailed block diagram of the PCI application bridge 214 in accordance with one embodiment of the present invention. It should be appreciated, however, that the PCI application bridge 214 illustrated herein is equally suitable for use between any two PCI buses using a single expansion ROM for initializing both the host computer 202 and the PCI bus subsystem 204. As shown, the PCI application bridge 214 includes bridge FIFO and control circuitry 502, a primary PCI interface 504, a secondary PCI interface 506, an address translation and forwarding logic 508, an expansion ROM base address register 510, and an expansion ROM translated base address register 512. The PCI interfaces 504 and 506 provide the bridge 214 with interface functions between the primary and secondary PCI buses 212 and 216 for communicating data and control signals. In particular, the primary PCI interface 504 interfaces with the primary PCI bus 212 on the host side while the secondary PCI interface 506 interface with the secondary PCI bus 216.

The PCI application bridge 214 functions to facilitate communication between PCI devices coupled to the primary PCI bus 212 and the secondary PCI bus 216 by mapping address space of one bus into the address space of the other bus. Specifically, the bridge FIFO and control circuitry 502 provided between the primary and secondary PCI bus interfaces 504 and 506 receives transactions (e.g., requests or commands) on one bus as a slave and determines whether to pass the transaction to the other bus. When it determines that the transaction is to be passed on to the other bus, the bridge FIFO and control circuitry 502 transmits the transaction onto the other bus as a master. For example, the bridge FIFO and control circuitry 502 may receive and transmit a request between the PCI buses 212 and 216 via PCI interfaces 504 and 506.

For arbitrating access to the secondary PCI bus 216, a conventional PCI arbiter (not shown) may also be provided internally between the secondary PCI interface 506 and the bridge FIFO and control circuitry 502 or externally coupled to the secondary PCI bus 216. The arbiter receives and evaluates requests for access to the secondary PCI bus from one or more PCI devices (e.g., SCSI adapter 222, RAID controller 218) attached to the secondary PCI bus 216 and grants the PCI bus to one of the requesting PCI devices as a bus master. In selecting the bus master, the PCI arbiter may implement any well-known system-specific arbitration algorithm.

The PCI application bridge 214 also includes primary and secondary configuration registers to allow communication among PCI bus devices. These configuration registers are used to store information required for communication with other PCI devices such as device ID, vendor ID, status, command, class code, revision ID, header type, latency timer, cache line size, and the like in accordance with well known PCI bus specifications. To function as a bridge, the PCI application bridge 214 typically needs to determine whether it is to function as a master or a slave. For example, when a request is received from a master on the secondary PCI bus 216, the bridge FIFO and control circuitry 502 determines that the bridge 214 is to function as a slave device. Similarly, the bridge FIFO and control circuitry 502 determines that the bridge 214 is to function as a master device on the primary bus 212 when the bridge 214 issues a proxy request for the received request to a target device on the primary PCI bus 212.

Figure 6:
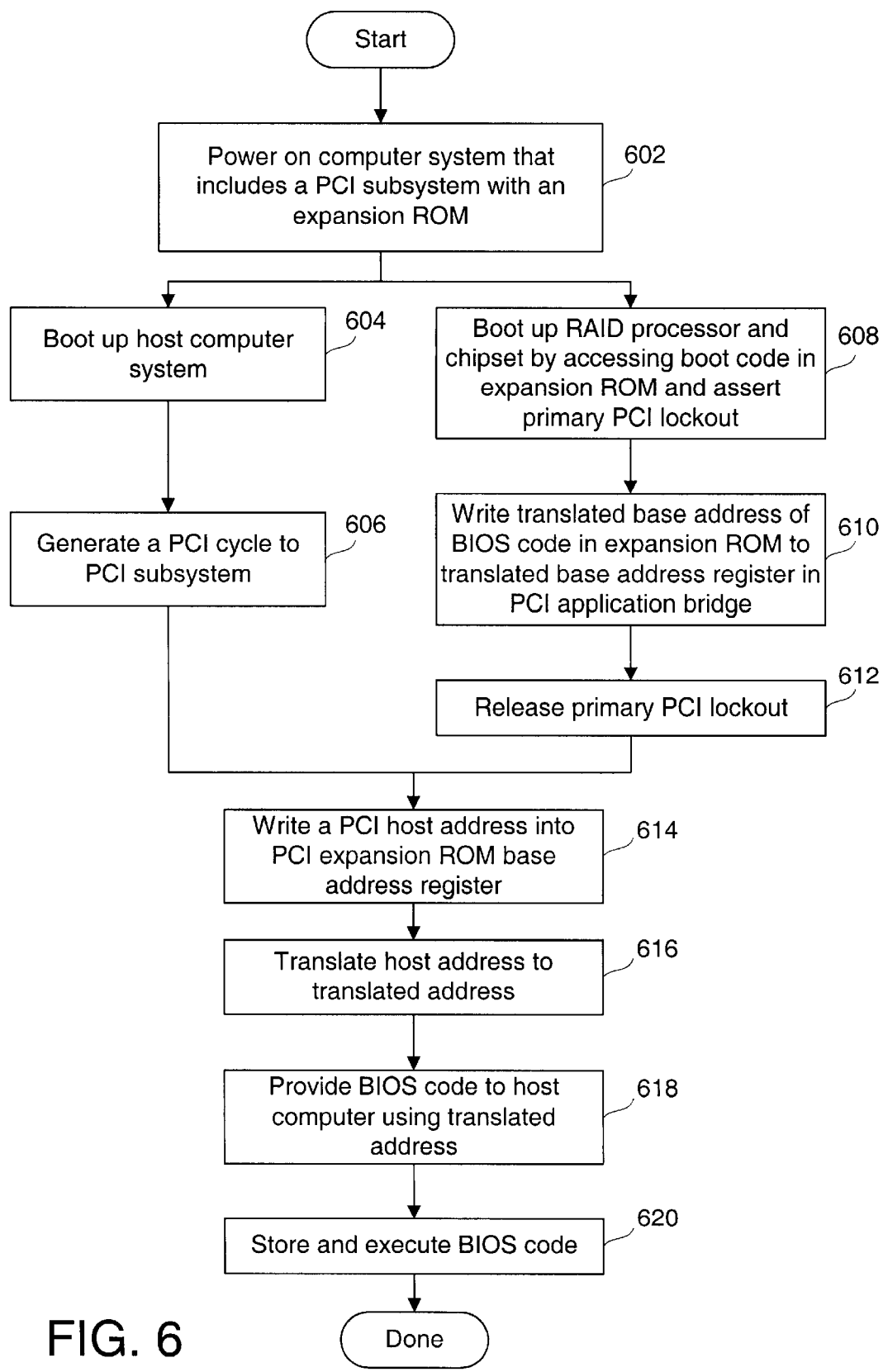
FIG. 6 illustrates a flowchart of an exemplary method for booting up the computer system using the expansion ROM in accordance with one embodiment of the present invention.

FIG. 6 illustrates a flowchart of an exemplary method for booting up the computer system 200 using the expansion ROM 220 in accordance with one embodiment of the present invention. In this method, the computer system 200 having an intelligent PCI bus subsystem 204 with a single expansion ROM 220 is powered on in operation 602. When the system 200 is powered on, the host computer 202 and RAID processor and chipset proceed to boot up in parallel. In one branch of the parallel boot-up process, the host computer 202 boots up and configures its internal settings in operation 604 and proceeds to scan the primary PCI bus 212. At this time, for example, PCI address space is configured and allocated to provide mutually exclusive addresses to attached PCI devices. When the host computer finds the attached PCI bus subsystem 204, it generates and sends a PCI cycle to the PCI subsystem 204 with a host address specifying the PCI base address.

In the PCI subsystem 204, on the other hand, the RAID processor and chipset 218 boots up by accessing the boot code in its expansion ROM 220. At this time, the RAID processor and chipset 218 asserts a primary PCI lockout to the primary PCI bus 212 via PCI application bridge 214. The primary PCI lockout effectively "locks out" the host computer 202 from accessing the PCI subsystem 204. For example, when the host computer 202 attempts to access the PCI subsystem 204 by sending a PCI cycle, the PCI application bridge 214 sends a retry command to the host computer 202 to retry access at a later time.

After booting up, the RAID processor and chipset 218 obtains and writes, in operation 610, a translated base address of the BIOS code in the expansion ROM 220 to the translated base address register 512 in the PCI application bridge 214. In addition to the start address of the BIOS code, the PCI application bridge 214 may also receive other parameters such as the size for the BIOS code. Then, the RAID processor and chipset 218 causes the PCI application bridge 214 to release the primary PCI lockout in operation 612, for example, by writing to a specified register in the configuration registers in the application bridge 214. The release of the lockout allows the PCI bridge 214 to accept a PCI cycle from the host computer 202.

When the host computer sends a PCI cycle to the bridge 214 with a host address, in operation 614, the PCI application bridge 214 receives the host address and stores the address in the expansion ROM base address register 510. It should also be noted that the PCI application bridge 214 may also receive other parameters such as the allocated size for the BIOS code. Then in operation 616, the address translation and forwarding logic 508 then translates the host address into a translated address by replacing the base address of the host address with the stored translation base address.

Once the host address has been translated, BIOS code is accessed and provided to the host computer in operation 618. For example, the PCI application bridge 214 sends the translated address along with corresponding request to the RAID processor and chipset 218 to access the BIOS code in the expansion ROM 220. The RAID processor and chipset 218 then accesses the BIOS code starting at the translated address and transmits the BIOS code to the bridge FIFO and controller 502, which then transmits the data to the host computer 202. The host computer 202 receives the BIOS code from the PCI application bridge 214 and stores the code in an area in the main memory 210 allocated to store the BIOS code in operation 618. The host computer 202 executes the BIOS code for initialization.

The present invention thus allows a host computer and PCI bus subsystem to boot up and initialize using a single expansion ROM. In particular, the use of a translation and forwarding logic circuitry to translate a host address to the starting address of the BIOS code in the expansion ROM allows the host computer to access the BIOS code in an efficient manner. Furthermore, by using a single ROM to store both the boot code and BIOS code, duplicate logic circuits for accessing multiple expansion ROMs are largely eliminated.

Thus, the present invention, intelligent expansion ROM sharing bus subsystem, is disclosed. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A RAID controller coupled to a host computer system through a primary PCI bus, comprising:
    a PCI application bridge coupled to interface data and command transfers between said primary PCI bus and a secondary PCI bus;
    a RAID processor and chipset coupled to said secondary PCI bus for controlling access to one or more RAID arrays; and
    an expansion ROM for storing device specific codes and BIOS codes for initializing said RAID controller and said host computer system for boot-up, wherein said RAID processor and chipset accesses said device specific codes in said expansion ROM to initialize said RAID controller, said RAID processor and chipset providing a first address corresponding to said BIOS codes in said expansion ROM to said PCI bus application bridge, wherein said PCI application bridge translates a host address from said host computer system using said first address to access said BIOS codes for initializing said host computer system.

2. The RAID controller as recited in claim 1, wherein said PCI application bridge includes:
    an expansion ROM base register for storing said host address from said host computer, wherein said host address is an address in a PCI address space; and
    an expansion ROM translated base address register for storing said first address corresponding to said BIOS codes in said expansion ROM.

3. The RAID controller as recited in claim 2, wherein said PCI application bridge provides said accessed BIOS codes to said host computer system, wherein said host computer system stores said BIOS codes in a main memory for initialization.

4. The RAID controller as recited in claim 2, wherein each of said host address and first address includes a base and an offset, wherein said PCI application bridge further includes an address translation and forwarding logic for translating said host address into said first address, wherein said address translation and forwarding logic replaces said base of said host address to form said first address for accessing said BIOS codes at said first address.

5. The RAID controller as recited in claim 2, wherein said PCI application bridge further includes:
    an address translation logic coupled to said expansion ROM base address register and said expansion ROM translated base address register for translating an address from said host computer into an address in said expansion ROM.

6. The RAID controller as recited in claim 1, further comprising:
    a PCI-to-SCSI adapter coupled to interface said secondary PCI bus with a SCSI bus; and
    a RAID array coupled to said SCSI bus for storing data.

7. The RAID controller as recited in claim 4, wherein said PCI application bridge further includes:
    a primary PCI interface coupled to said primary PCI bus;
    a secondary PCI interface coupled to said secondary PCI bus; and
    a bridge FIFO and controller for controlling said data and command transfers between said primary and secondary PCI buses.

8. The RAID controller as recited in claim 1, wherein said host computer system is initialized after said RAID controller has been initialized upon boot-up.

9. An intelligent bus subsystem for use with a host computer, said bus system being coupled to said host computer through a primary bus, said intelligent bus subsystem comprising:
    an application bridge coupled to interface data and command transfers between said primary bus and a secondary bus;
    a local processor and chipset coupled to said secondary bus for processing data; and
    an expansion ROM coupled to said local processor and chipset for storing device specific codes and BIOS code for initializing said local processor and chipset and said host computer system for boot-up, wherein said local processor and chipset accesses said device specific codes in said expansion ROM to initialize said local processor and chipset, said local processor and chipset providing a starting base address to said BIOS code in said expansion ROM to said bus application bridge, wherein said application bridge translates a host address from said host computer system using said starting base address to access said BIOS code for initializing said host computer system.

10. The intelligent bus subsystem as recited in claim 9, wherein said primary and secondary buses are PCI buses, and wherein said application bridge is a PCI bridge.

11. The intelligent bus subsystem as recited in claim 9, wherein said host address is an address in a PCI address space.

12. The intelligent bus subsystem as recited in claim 11, wherein said application bridge includes:
    an expansion ROM base register for storing said second base address from said host computer; and
    an expansion ROM translated base address register for storing said first base address to said BIOS code in said expansion ROM.

13. The intelligent bus subsystem as recited in claim 12, wherein said application bridge provides said accessed BIOS code to said host computer system, wherein said host computer system stores said BIOS code in a main memory for initialization.

14. The intelligent bus subsystem as recited in claim 13, further comprising:
   a PCI-to-SCSI adapter coupled to interface said secondary bus with a SCSI bus; and
   a SCSI disk drive array coupled to said SCSI bus for storing data.

15. The intelligent bus subsystem and chipset subsystem as recited in claim 13, wherein said application bridge further includes:
   an address translation logic coupled to said expansion ROM base address register and said expansion ROM translated base address register for translating said host address from said host computer into said starting address in said expansion ROM.

16. The intelligent bus subsystem as recited in claim 15, wherein said application bridge further includes:
   a primary interface coupled to said primary Pd bus;
   a secondary interface coupled to said secondary PCI bus; and
   a bridge FIFO and local processor and chipset for controlling said data and command transfers between said primary and secondary buses.

17. The intelligent bus subsystem as recited in claim 10, wherein said intelligent bus subsystem is a RAID controller subsystem.

18. An intelligent bus subsystem coupled to a host computer through a primary bus, comprising:
   an application bridge coupled to interface data and command transfers between said primary bus and a secondary bus;
   a local processor and chipset coupled to said secondary bus for processing and interfacing data and commands; and
   an expansion ROM for storing device specific codes and BIOS code for initializing said bus subsystem and said host computer system for boot-up, wherein said local processor and chipset accesses said device specific code in said expansion ROM to initialize said bus subsystem, said local processor and chipset providing a translated base address corresponding to said BIOS code in said expansion ROM to said application bridge, wherein said application bridge translates a host base address from said host computer system using said translated base address to access said BIOS codes for initializing said host computer system.

19. The intelligent bus subsystem as recited in claim 18, wherein said application bridge includes:
   an expansion ROM base register for storing said host address from said host computer, wherein said host address is an address in a PCI address space;
   an expansion ROM translated base address register for storing said first address corresponding to said BIOS codes in said expansion ROM; and
   an address translation and forwarding logic for translating said host address into said translated base address for accessing said BIOS code.

20. The intelligent bus subsystem as recited in claim 19, wherein said application bridge provides said accessed BIOS code to said host computer system, wherein said host computer system stores said BIOS codes in a main memory for initialization.

21. The intelligent bus subsystem as recited in claim 20, wherein each of said host address and first address includes a base and an offset, wherein said address translation and forwarding logic translates said base of said host address to form said translated base address.

22. The intelligent bus subsystem as recited in claim 20, wherein primary and secondary buses are PCI buses, wherein said intelligent bus subsystem further comprises:
   a PCI-to-SCSI adapter coupled to interface said secondary PCI bus with a SCSI bus; and
   a SCSI disk drive array coupled to said SCSI bus for storing data.

23. The intelligent bus subsystem as recited in claim 20, wherein said application bridge further includes:
   a primary interface coupled to said primary bus;
   a secondary interface coupled to said secondary bus; and
   a bridge FIFO and controller for controlling said data and command transfers between said primary and secondary buses.

24. The intelligent bus subsystem as recited in claim 20, wherein said host computer system is initialized after said bus subsystem has been initialized upon boot-up.

25. The intelligent bus subsystem as recited in claim 20, wherein said bus subsystem is a RAID controller.

* * * * *